United States Patent [19]
Santi

[11] Patent Number: 5,191,864
[45] Date of Patent: Mar. 9, 1993

[54] ENGINE CYLINDER BORE
[75] Inventor: John Santi, West Allis, Wis.
[73] Assignee: Briggs & Stratton Corporation, Wauwatosa, Wis.
[21] Appl. No.: 829,710
[22] Filed: Feb. 3, 1992
[51] Int. Cl.[5] ............................................. F02F 1/00
[52] U.S. Cl. ................................................... 123/193.2
[58] Field of Search .......................... 123/193.2, 668

[56] References Cited
U.S. PATENT DOCUMENTS

| | | | |
|---|---|---|---|
| 3,735,615 | 5/1973 | Shneider | 72/75 |
| 3,792,518 | 2/1974 | Cross et al. | 92/169 |
| 3,820,966 | 6/1974 | Sejbal et al. | 51/309 |
| 3,896,009 | 7/1975 | Kobayashi et al. | 123/193.2 |
| 3,932,228 | 1/1976 | Sugiyama et al. | 123/193.2 |
| 4,434,588 | 3/1984 | Wada et al. | 51/344 |
| 4,483,755 | 11/1984 | Heck et al. | 204/129.1 |
| 4,557,640 | 12/1985 | Rottler | 408/27 |
| 4,683,680 | 8/1987 | Bender | 51/34 |
| 4,706,417 | 11/1987 | Gary | 51/319 |
| 4,896,638 | 1/1990 | Shepley | 408/75 |
| 4,934,351 | 6/1990 | Shepley | 123/193.1 |
| 4,967,458 | 11/1990 | Rosenberg et al. | 29/888.011 |
| 4,980,996 | 1/1991 | Klink et al. | 51/290 |
| 4,986,230 | 1/1991 | Panyard et al. | 123/668 |

OTHER PUBLICATIONS

"The Cross Aluminum Cylinder" Automotive Engineer Apr., 1964 pp. 135-139.
Cogsdill Tool Products, Inc. brochure entitled "Shefcut Precision Reamers ...", copyright 1990.

Primary Examiner—Noah P. Kamen
Attorney, Agent, or Firm—Andrus, Sceales, Starke & Sawall

[57] ABSTRACT

A method of cutting and finishing a cylinder bore surface yields a highly polished finish having substantially no tool marks. The method includes removing a first thickness of surface material using a diamond-tipped rough cutter disposed on a rotating milling tool head. A second thickness of material is then removed by a diamond-tipped finish cutter also disposed on the same rotating head. The finish cutter removes between 0.0015 to 0.002 inches of material, which corresponds to the majority of the material left in the compressive state after the rough cut step.

5 Claims, 2 Drawing Sheets

ENGINE CYLINDER BORE

BACKGROUND OF THE INVENTION

This invention relates to internal combustion engines, and more particularly to a method and apparatus for cutting and finishing a cylinder bore surface of such an engine.

Various methods are known for boring, cutting and finishing cylinder bore surfaces of internal combustion engines. In a typical prior art method, a boring tool bores out a cylinder bore. In a subsequent step, a grinding tool machines the bored surface and leaves a pattern of tool marks having a cross-hatched configuration.

The boring tool applies a great deal of concentrated force to the cylinder bore surface, thereby compressing the material near the surface. In a typical prior art method, a thickness of between about 0.0005 to 0.010 inches of material is compressed during the boring process.

Unfortunately, leaving the bore surface material in a compressed state causes problems which arise after the engine is placed into use. One typical problem is that ridges tend to appear on the bore surface which are generally parallel to the bore's longitudinal axis. These ridges are scraped by the piston rings during piston reciprocation, causing metal filings to collect beneath one or more of the compression piston rings. These metal filings tend to scrape against the side of the piston, causing piston galling.

SUMMARY OF THE INVENTION

A method of cutting and finishing a cylinder bore surface of an internal combustion engine is disclosed which yields a highly polished finish and in which the bore surface layer is not left in a compressive state as in prior art methods. This method achieves a unique cylinder bore surface which overcomes the problems of the prior art and which is substantially free of visible tool marks.

In the preferred embodiment, a rotatable head having a diamond-tipped rough cutter and a diamond-tipped finish cutter is used to cut and finish the bore surface. The rough cutter and the finish cutter are preferably placed at 90° angles on the outer surface of the head with the rough cutter leading the finish cutter. When the head is rotated in the cylinder bore, the rotating rough cutter engages and removes a first thickness of material from the bore surface. The material removed during the rough cutting step is between about 0.030 to 0.040 inches or more.

The rotating finish cutter then engages and removes a second thickness of material from the bore surface, the second thickness being preferably between about 0.0005 to 0.010 inches. The material removed by the finish cutter preferably corresponds to the material left in the compressive state by the rough cutter and/or by the boring tool.

The rough cutter and the finish cutter rotate in respective planes which are substantially perpendicular to the bore axis. At the same time, the relative axial position between the finish cutter and the cylinder bore is changed by either moving the cylinder bore or the rotating head in an axial direction. Thus, both the rough cutter and the finish cutter traverse helical paths. The circular movement of the finish cutter during this axial feed results in a unique mirror-like bore surface that is substantially free of tool marks.

In a preferred embodiment, the angle between the rough cutter and the finish cutter is between 30° to 120°, with 90° being optimum. This angular position has been found to yield the best finished surface, particularly where each of the cutters has an opposite wear pad and when other wear pads are placed on the outer surface of the rotating head to properly orient and balance the head.

It is a feature and advantage of the present invention to provide a cylinder bore finish that is superior to that found in the prior art.

It is another feature and advantage of the present invention to provide a cylinder bore surface in which the majority of the material placed in a compressive state is removed during the finishing step.

It is yet another feature and advantage of the present invention to use two diamond-tipped cutters to cut and finish the cylinder bore surface of an internal combustion engine.

It is yet another feature and advantage of the present invention to provide a cylinder bore surface having a mirror-like finish that is substantially free of tool marks.

These and other features and advantages of the present invention will be apparent to those skilled in the art from the following detailed description of preferred embodiment and the drawings, in which:

BRIEF DESCRIPTION OF THE DRAWINGS

FIG. 5 depicts the rotating head before it enters a cylinder bore.

FIG. 6 depicts the rough cutting step of the method according to the present invention.

FIG. 7 depicts the rotating head performing both a rough cut and a finish cut of the cylinder bore.

DETAILED DESCRIPTION OF THE PREFERRED EMBODIMENT

Figure 1:
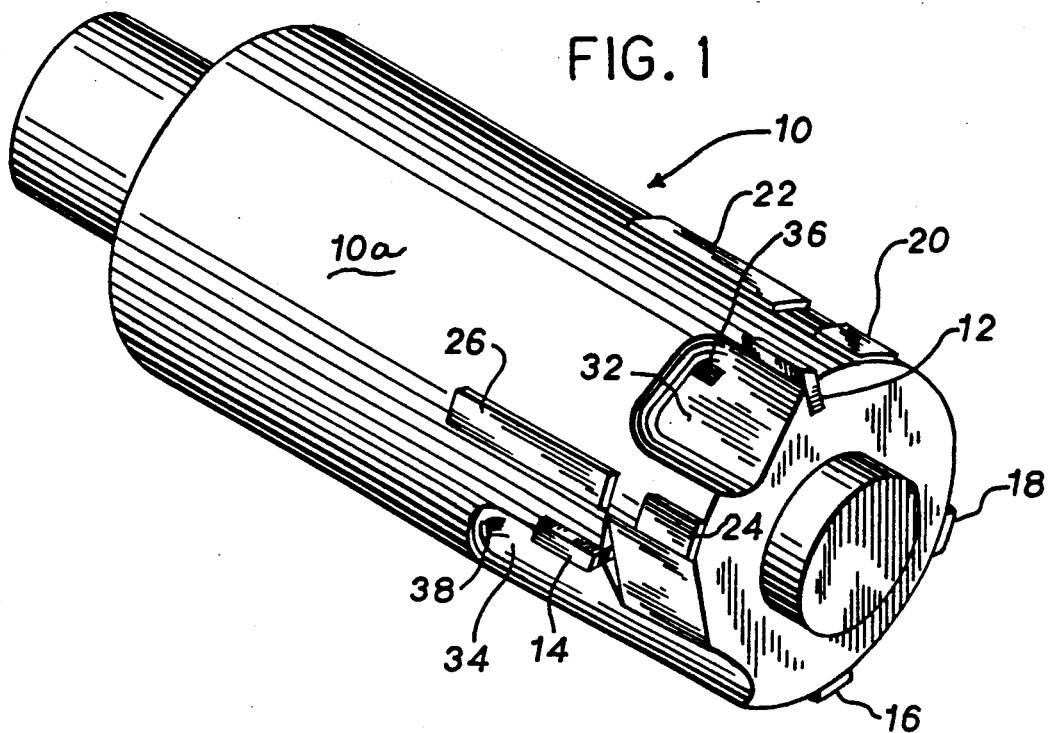
FIG. 1 is a perspective view of a rotatable milling tool head used with the method of the present invention.

FIG. 1 depicts a rotatable milling tool head which is preferably used with the method of the present invention. The tool in FIG. 1 is used with a standard milling machine, and may be specially manufactured by a number of manufacturers including Cogsdill Tool Products, Inc. of Camden, S.C. The rotating tool preferably performs both the rough cut and the finish cut steps substantially simultaneously.

In FIG. 1, head 10 is substantially cylindrical in shape and has a rough cutter 12 and a finish cutter 14 as inserts on its periphery. Rough cutter 12 and finish cutter 14 are substantially identical tool inserts having polycrystalline diamond or diamond stones on their respective cutting surfaces. As more clearly shown in FIG. 2, rough cutter 12 and finish cutter 14 form a 90° central angle with respect to each other. It has been found that an angle of about 90° between the cutters yields the most uniform cylinder bore, particularly when the cutters are balanced by appropriate wear pads. However, other angles between 30°-120° may be used.

Figure 2:
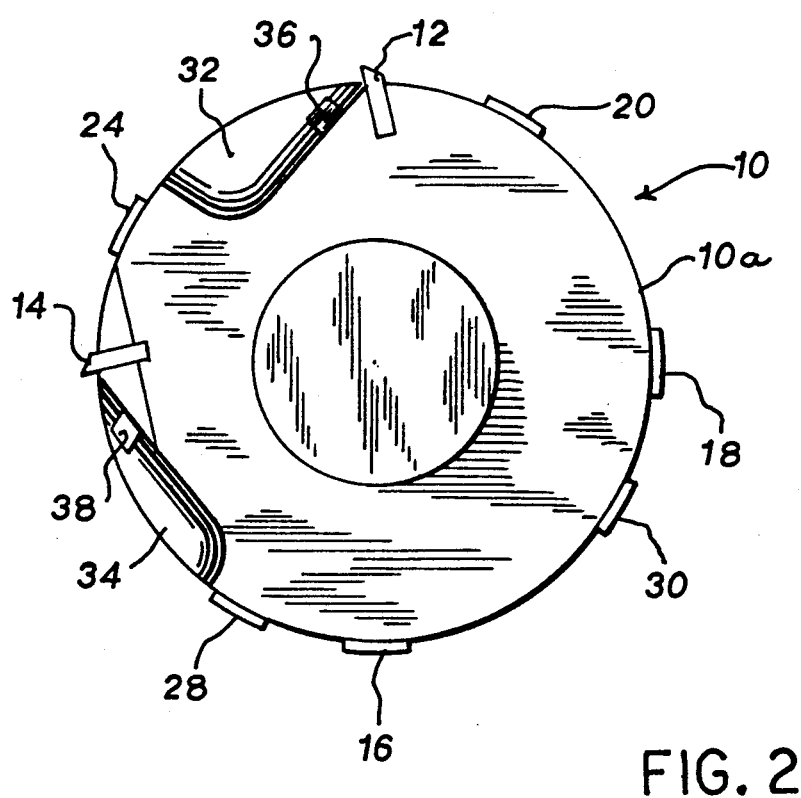
FIG. 2 is an end view of the tool head of FIG. 1.

In FIGS. 1 and 2, rough cutter 12 has an opposed wear pad 16 that is disposed 180° from it on outer surface 10a of tool 10. Similarly, finish cutter 14 has a wear pad 18 disposed 180° from it on outer surface 10a of tool head 10. The tool head has additional wear pads 20, 22, 24, 26, 28, and 30 disposed on its outer surface to further insure that the rough cutter and the finish cutter remove uniform thicknesses of material from the bore surface. Pads 16, 20, 24, and 30 are designed to offset the movement and forces imposed by rough cutter 12. Similarly, pads 18, 22, 26, and 28 offset the movement and forces imposed by finish cutter 14 during the finish cutting step.

Figure 3:
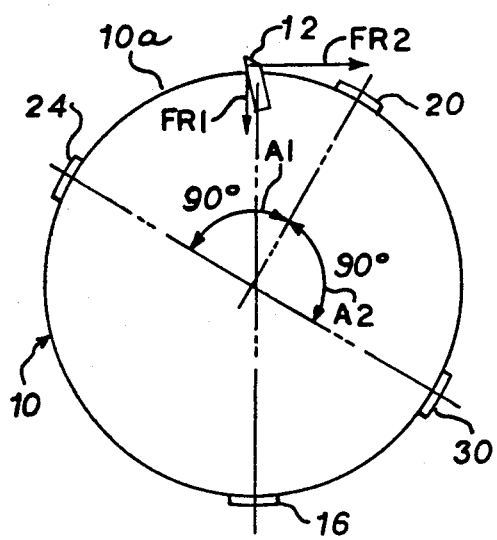
FIG. 3 is a diagrammatic view depicting the angles between the rough cutter and the rough cutter wear pads of the tool head in FIG. 1.
Figure 4:
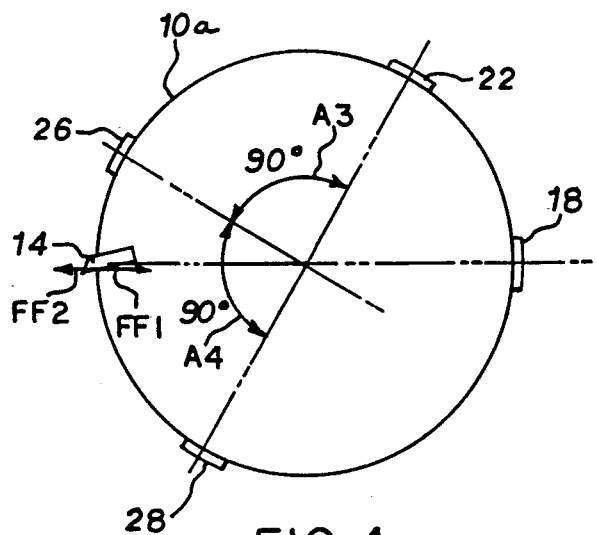
FIG. 4 is a diagrammatic view depicting the angles between the finish cutter and the finish cutter wear pads of the tool head in FIG. 1.

FIGS. 3 and 4 more clearly depict the orientation of each of the cutters with respect to their associated wear pads. FIG. 3 depicts rough cutter 12 and its associated wear pads 16, 20, 24, and 30. FIG. 4 depicts finish cutter 14 and its associated wear pads 18, 22, 26, and 28.

As shown in FIG. 3, the rough cutting step using rough cutter 12 results in force vectors FR1 and FR2. Force vector FR1 is radial, and would result in an off-center cylinder bore if it was not opposed by a wear pad 16. Force vector FR2 is tangential to outer surface 10a of tool 10, and may also result in an off-center bore. However, vectors FR1 and FR2 are also balanced by wear pads 20, 24, and 30 to insure that the same amount of material is removed from every portion of the cylinder bore surface during the rough cut step. Wear pads 20 and 24 are oriented to create a central angle A1 of 90° with respect to each other. Also, wear pads 20 and 30 are oriented to create a central angle A2 of 90° with respect to each other.

As shown in FIG. 4, the finish cutting step results in force vectors FF1 or FF2 which are generally radial in direction. Since the finish cutting step does not remove a great deal of material from the bore surface, it is not always certain whether the force imposed by the bore surface is greater than the force imposed by cutter 14 (corresponding to vector FF1) or whether the force imposed by cutter 14 is greater than the force imposed by the bore surface (corresponding to vector FF2). In either case, the force tangential to tool surface 10a during the finish cutting step is negligible and is not shown.

FIG. 4 also depicts the orientations of the wear pads to achieve the most uniform finish cutting of the bore surface. As shown in FIG. 4, finish pad 18 is disposed directly opposite finish cutter 14 on a line that is generally parallel to force vectors FF1 and FF2. Wear pads 22 and 26 are disposed so that they create a central angle A3 of 90° with respect to each other. Similarly, wear pads 26 and 28 are disposed so that they create a central angle A4 of 90° with respect to each other.

Referring again to FIGS. 1 and 2, the metal filings generated by cutters 12 and 14 tend to collect in indentations 32 and 34 which are formed in the outer surface 10a of tool head 10. To prevent these metal filings from lodging between the cutters and the bore surface, a highly pressurized coolant flows from holes 36 and 38 to blow the metal filings away from cutters 12 and 14. The coolant also acts as a heat exchanger to reduce the temperature of tool 10 and of the bore surface.

Figure 5:
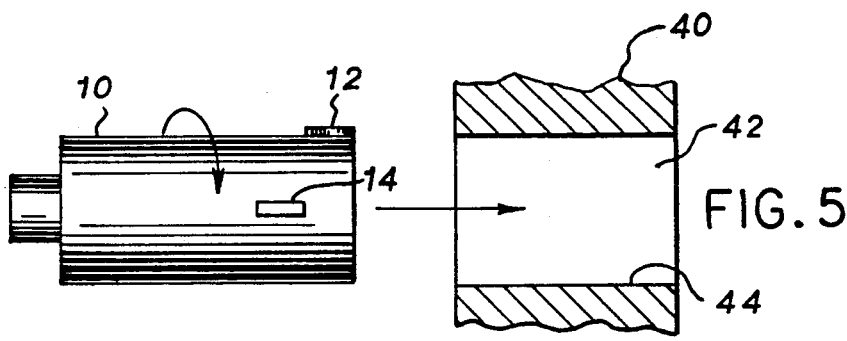
FIGS. 5 through 7 sequentially depict the rotatable head of FIG. 1 being used to cut a cylinder bore.
Figure 6:
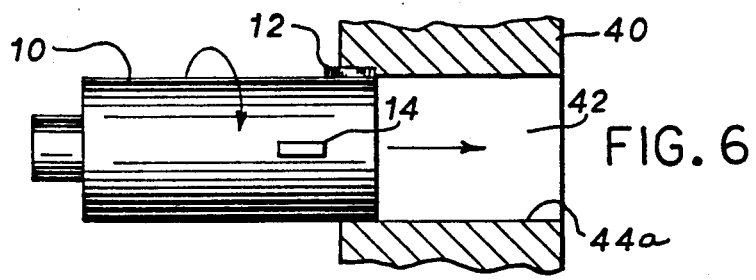
Figure 7:
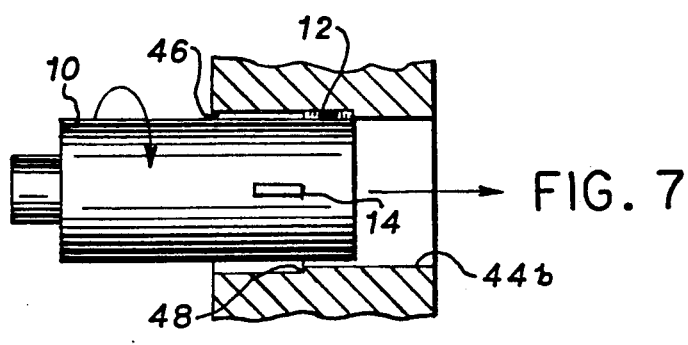

FIGS. 5 through 7 depict the steps in rough cutting and finish cutting a cylinder bore according to the present invention. Referring to FIG. 5, an engine housing 40 has a cylinder bore 42 which has been bored by a boring tool as is well known in the art. Once bore 42 is completely finished, it receives a piston which reciprocates therein in response to the rotation of a crankshaft interconnected with the piston, as is well known in the art.

In FIG. 5, cylinder bore 42 has a bore surface 44 created by the boring tool. The boring tool creates a smooth surface 44, but also leaves the material near surface 44 in a compressive state due to the highly concentrated forces imposed by the boring tool on the cylinder material. A primary purpose of the present invention is to remove the majority of the material near the bore surface which has been left in the compressive state by either the boring tool or by rough cutter 14. It has been found that when material in the compressive state remains near the bore surface, ridges which are generally parallel to the axis of the reciprocating piston tend to form after the engine is placed into service. These ridges are scraped by the compression piston rings, resulting in the buildup of metal filings between the piston rings. These metal filings may cause piston galling when they become lodged between the piston surface and the cylinder bore surface.

Referring again to FIG. 5, tool head 10 is rotated and is moved in an axial direction towards bore 42. Tool head 10 preferably rotates at about 3,160 revolutions per minute, and is fed or axially moved at a rate of 0.004 inches per revolution. Finish cutter 14 is also disposed about 0.75 inches axially rearward of rough cutter 12 so that the rough cutter engages each portion of the bore surface before the finish cutter.

As shown in FIG. 6, tool 10 continues to rotate and is axially moved until rough cutter 12 engages bore surface 44a. The rough cutter preferably removes a thickness 46 (FIG. 7) of at least 0.03 inches of material from bore surface 44 before finish cutter 14 removes any material from the same portion of the bore surface.

As shown in FIG. 7, finish cutter 14 then removes a thickness 48 of material in addition to thickness 46 removed by rough cutter 12. Thickness 48 corresponds to the majority of the remaining amount of material left in the compressive state, and is between 0.0005 to 0.010 inches. In a preferred embodiment, thickness 48 is between 0.0015 to 0.002 inches.

The method and apparatus according to the present invention achieve a bore surface that is substantially free of visible tool marks. In contrast, typical prior art grinding and honing methods result in a 60° cross-hatched pattern of tool marks. Also, the method of the present invention yields a bore surface having a highly glossed, mirrorlike finish which is easily visually distinguishable from the dull surface finish created by prior art methods.

The method according to the present invention may be used to finish cylinder bores made from aluminum alloys as well as from steel, cast iron, and other materials. The diamond-tipped cutters are best suited for use with bore surfaces made from aluminum alloys. If the bore surface is made from steel, cast iron, or from another carbon-containing material, cubic boron nitrate (CBN) should be used on the rough and finish cutter tips. The diamond cutter inserts and the CBN inserts are readily available from Valenite and from other suppliers.

Although a preferred embodiment of the present invention has been shown and described, other embodiments will be apparent to those skilled in the art and are within the scope of the present invention. Therefore, the present invention is to be limited only by the following claims.

I claim:

1. In an improved internal combustion engine having an engine housing, a mechanical cylinder bore formed within said housing, a piston that is reciprocable within and contacting said bore, and a rotatable crankshaft interconnected with said piston, the improvement comprising:
   a bore surface of said cylinder bore, said bore surface being substantially free of visible tool marks and being substantially free of compressive state material.

2. The internal combustion engine of claim 1, wherein said bore surface has a highly polished finish.

3. The internal combustion engine of claim 1, wherein said bore surface has a substantially mirror-like finish.

4. In an improved internal combustion engine having an engine housing, a cylinder machined bore formed within said housing, a piston that is reciprocable within and contacting said bore, and a rotatable crankshaft interconnected with said piston, the improvement comprising:
   a bore surface of said cylinder bore, said bore surface having a substantially mirrorlike finish and being substantially free of compressive state material.

5. The internal combustion engine of claim 4, wherein said bore surface is substantially free of visible tool marks.

* * * * *